United States Patent
Elferich et al.

(10) Patent No.: US 9,258,858 B2
(45) Date of Patent: Feb. 9, 2016

(54) ACTIVE CAPACITOR CIRCUIT

(71) Applicant: KONINKLIJKE PHILIPS N.V., Eindhoven (NL)

(72) Inventors: Reinhold Elferich, Aachen (NL); Toni Lopez, Kelmis (BE)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 14/344,203

(22) PCT Filed: Sep. 28, 2012

(86) PCT No.: PCT/IB2012/055180
§ 371 (c)(1),
(2) Date: Mar. 11, 2014

(87) PCT Pub. No.: WO2013/046160
PCT Pub. Date: Apr. 4, 2013

(65) Prior Publication Data
US 2014/0368128 A1    Dec. 18, 2014

Related U.S. Application Data

(60) Provisional application No. 61/541,343, filed on Sep. 30, 2011.

(51) Int. Cl.
*H05B 37/02* (2006.01)
*H05B 33/08* (2006.01)
(Continued)

(52) U.S. Cl.
CPC ............ *H05B 33/0815* (2013.01); *H02J 7/345* (2013.01); *H02M 1/15* (2013.01); *H05B 33/0809* (2013.01); *H05B 37/02* (2013.01)

(58) Field of Classification Search
CPC .................................................... H05B 37/02
USPC .............. 315/209 R, 224, 225, 297, 307, 308
See application file for complete search history.

(56) References Cited

U.S. PATENT DOCUMENTS

| 5,345,376 A | 9/1994 | Nourbakhsh |
| 7,202,608 B2 | 4/2007 | Robinson et al. |

(Continued)

OTHER PUBLICATIONS

C. Blanco et al; "A Single Stage Fluorescent Lamp Ballast With High Power Factor", Applied Power Electronics Conf. and Exposition, 1996. Conf Preceedings 1196.Eleventh Annual San Jose, CA US, Mar. 3, 1996, vol. 2, pp. 616-621, XP010159848.

(Continued)

Primary Examiner — Tung X Le (57) ABSTRACT

The present invention relates to an active capacitor circuit (40) for use in a driver device for driving a load (22), in particular an LED unit comprising one or more LEDs (23). Further, the present invention relates to a driver device comprising such an active capacitor circuit. The proposed active capacitor circuit comprises coupling terminals (41, 42) for providing a drive voltage (vD) and/or drive current (iD) for driving a load (22) to be coupled between said coupling terminals (41, 42), an output power stage (50) coupled between said coupling terminals (41, 42) for converting said periodic current (iA) into said drive current (iD), a low frequency capacitor (46) coupled between a capacitor output terminal (48) of said output power stage (50) and a coupling terminal (42), and a control unit (60) for controlling said output power stage (50) by use of a control signal (Sd) obtained from a feedback of the drive voltage (vD), a capacitor voltage (vC) across said low frequency capacitor (46) and/or a capacitor current (iC) through said low frequency capacitor (46).

14 Claims, 6 Drawing Sheets

(51) Int. Cl.
*H02M 1/15* (2006.01)
*H02J 7/34* (2006.01)

(56) References Cited

U.S. PATENT DOCUMENTS

| | | | | |
|---|---|---|---|---|
| 8,294,388 B2* | 10/2012 | Wong | ................ | H05B 33/0815 315/247 |
| 8,487,539 B2* | 7/2013 | Kuroki et al. | ............. | 315/209 R |
| 8,618,748 B2* | 12/2013 | Shiu | ................... | H05B 33/0815 315/291 |
| 2009/0273290 A1 | 11/2009 | Ziegenfuss | | |
| 2010/0270931 A1 | 10/2010 | Hui | | |
| 2010/0308733 A1 | 12/2010 | Shao | | |
| 2011/0193495 A1* | 8/2011 | Mishima et al. | ............. | 315/307 |
| 2012/0262082 A1* | 10/2012 | Esaki et al. | ................... | 315/224 |

OTHER PUBLICATIONS

J. Ribas et al; "A New Discharge Lamp Ballast Based on a Self-Oscillating Full-Bridge Inverter Integrated With a Buck-Type PFC Circuit", APEC 2001, 16th Annual IEEE Applied Power Electronics Conf. and Exposition, Anaheim, CA, Mar. 4, 2001, vol. 2, pp. 688-694, XP010536070.

Robert Erickson et al; "Design of a Simple High-Power-Factor Rectifier Based on the Flyback Converter", IEEE Proceedings of the Applied Power Electronics Conf. and Expositions, 1990, pp. 792-801.

Q. Hu et al; "A 0.9 PF LED Driver With Small LED Curretn Ripple Based on Series-Input Digitally-Controlled Converter", Proceedings of the APEC 2010, pp. 2314-2320.

Bogdan Bucheru et al; "Single Stage Isolated PFC With AC Line Ripple Steering" Delta Energy Systems, USA, PLCIM Europe 2011, May 17-19, 2011, Nuremberg, Germany.

Qingcong Hu et al; "Minimizing Required Energy Storage in Off-Line LED Drivers Based on Series-Input Converter Modules", IEEE Transactions on Power Electronics, May 13, 2010, pp. 1-21.

S.Y. Hui et al; "A Novel Passive Offline LED Driver With Long Lifetime", IEEE Transactions on Power Electronics, vol. 25, No. 10, Oct. 2010, pp. 2665-2672.

Changrong Liu et al; "Low Frequency Current Ripple Reduction Technique With Active Control in a Fuel Cell Power System With Inverter Load", IEEE Transactions on Power Electronics, vol. 22, No. 4, Jul. 2007, pp. 1429-1436.

Xiao Li et al; "Applying a Novel PMU to Replace the Large DC Bus Electrolytic Capacitors in Fuel Cell Power Generation System", IEEE 2010, vol. 978, No. 1, pp. 4540-4546.

* cited by examiner

FIG. 1

(Prior Art)

ACTIVE CAPACITOR CIRCUIT

FIELD OF THE INVENTION

The present invention relates to an active capacitor circuit for use in a driver device for driving a load, in particular an LED unit comprising one or more LEDs. The present invention relates further to a driver device for driving a load. Still further, the present invention relates to a light apparatus.

BACKGROUND OF THE INVENTION

In the field of LED drivers for offline applications such as retrofit lamps, solutions are demanded to cope with high efficiency, high power density, long lifetime, high power factor and low cost, among other relevant features. While practically all existing solutions compromise one or the other requirement, it is essential that the proposed driver circuits properly condition the mains power into the form required by the LEDs while maintaining compliance with present and future power mains regulations. It is of critical importance to guarantee that the perceptible light flicker does not exceed a maximum value (preferably zero) when the power factor is maintained above a certain limit.

Further, in off-line converters, energy from the power mains often needs to be drawn synchronously in proportion to the supplied voltage waveform in order to achieve a high power factor and low harmonic distortion. Power converter architectures with an independent preconditioner stage are traditionally employed to best accomplish this task without compromising the proper form of the energy to be supplied to the load.

Typically, two series-connected power stages are employed to obtain a high power factor while keeping the output power constant throughout a mains cycle (or supply cycle, i.e. the cycle of the mains voltage or the supply voltage). In those architectures, the first stage shapes the mains current and the second stage performs the power conversion to the load.

Nonetheless, for reasons related to complexity and cost, simplified powertrain solutions are adopted known conventionally as single-stage, where either of the two stages may essentially not be incorporated. As a consequence of such simplification, the aforementioned requirements may be largely compromised and/or converter performance highly degraded, particularly in terms of size, reliability and lifetime. The latter is usually mainly attributed to the need for using a bulky low frequency storage capacitor in parallel to the load when constant output power delivery is to be guaranteed.

Single stage solutions are common in literature. One reference example is given in the work of Robert Erickson and Michael Madigan, entitled "Design of a simple high-power-factor rectifier based on the flyback converter", IEEE Proceedings of the Applied Power Electronics Conferences and Expositions, 1990, pp. 792-801.

An intermediate solution, half-way between the two-stage and single-stage approaches, is the single-stage converter with integrated preconditioner. Such solutions can feature reduced component count and high power density while keeping compliance with both load and power mains requirements. Other embodiments with a single power converting stage allow high power factors (HPF) by means of integrating a boost converter operating in discontinuous conduction mode. These converters actually combine the above mentioned two power conversion stages.

Typically, high power factor operation of driver devices for driving a load, such as LED units comprising one or more LEDs, causes strong 100 Hz output current ripple even if large filter capacitors are used. These filters are almost ineffective if employed parallel to LED loads with steep IV (current versus voltage) characteristics (also called "diode characteristics"). It is known from electric vehicles and photovoltaic systems that dc/dc-converters between load and capacitor improve the exploitation of (super-) capacitors.

Q. Hu and R. Zane, "A 0.9 PF LED Driver with Small LED Current Ripple Based on Series-input Digitally-controlled Converter", Proceeding of the APEC 2010, pp. 2314-2320 describe a two-stage LED driver using a bidirectional step down converter as second power stage, which connects the 120 Hz capacitor to the LED load, which also is connected to the output of the first power stage.

SUMMARY OF THE INVENTION

It is an object of the present invention to provide an active capacitor circuit for use in a driver device for driving a load, in particular an LED unit comprising one or more LEDs, which avoids the use of an ever larger electrolytic capacitor as is typically employed in parallel with offline driven LED loads, and which leads to virtually no 100/120 Hz-ripple/flicker (e.g. <1%) even at the low dynamic resistance of modern power LEDs.

It is a further object of the present invention to provide a driver device for driving a load and a light apparatus.

In a first aspect of the present invention, an active capacitor circuit is presented that comprises
- coupling terminals for providing a drive voltage and/or drive current for driving a load to be coupled between said coupling terminals,
- an output power stage coupled between said coupling terminals for converting said periodic current into said drive current,
- a low frequency capacitor coupled between a capacitor output terminal of said output power stage and a coupling terminal, and
- a control unit for controlling said output power stage by use of a control signal obtained from a feedback of the drive voltage, a capacitor voltage across said low frequency capacitor and/or a capacitor current through said low frequency capacitor.

In a further aspect of the present invention, a driver device is presented comprising
- power input terminals for receiving a periodic supply voltage from an external power supply,
- an input converter stage coupled to said power input terminals for converting said periodic supply voltage into said drive voltage and for outputting an intermediate current at converter output terminals, and
- an active capacitor circuit according to the present invention coupled to said converter output terminals of said input converter stage.

In a still further aspect of the present invention, a light apparatus is presented comprising
- a light assembly comprising one or more light units, in particular an LED unit comprising one or more LEDs, and
- a proposed driver device for driving said light assembly.

Preferred embodiments of the invention are defined in the dependent claims. It shall be understood that the claimed driver device and the claimed light apparatus have similar and/or identical preferred embodiments as the claimed active capacitor circuit and as defined in the dependent claims.

The proposed active capacitor circuit represents a module that is coupled in parallel to the load (e.g. one or more LEDs or LED packages) or that is integrated into the load and to which a small capacitor is connected, which also could be integrated into the load. By contrast, in most prior art approaches the power stages are arranged in cascade.

Further, the proposed active capacitor circuit can be regarded as an independent, highly compact, high-order-low-pass filter element (i.e. effectively removing all AC components of a first stage from the load). In one embodiment, however, some bands of the spectrum may be passed, thus enabling some level of load modulation.

According to the driver disclosed by Q. Hu and R. Zane cited above, both first and second stages are in parallel with the load. The advantage of the proposed active capacitor circuit with respect to this prior art is that the proposed active capacitor circuit can operate stand-alone, i.e. like a passive filter circuit, but with significantly enhanced performance. Such operation facilitates modularity, integrability, and plug&play usage like easy replacement of existing output filter circuits. Further, it requires neither a measurement of load current or other power stage current nor a signal connection to any power stage.

Preferably, one or more feedback loops, in particular two cascaded feedback loops, are provided according to the present invention for controlling said capacitor current and/or capacitor voltage. In particular, according to a preferred embodiment said control unit comprises a first feedback loop for controlling said capacitor current to follow a reference capacitor current. Preferably, said control unit is configured to determine said reference capacitor current from said drive voltage by high-pass filtering said drive voltage and amplifying the high-pass filtered drive voltage by a drive voltage amplification factor. Still further, in an embodiment said control unit is configured to determine said drive voltage amplification factor in dependence on the voltage drop of the dynamic resistance of said load to be coupled between said coupling terminals.

Assuming that the active capacitor circuit is used in a driver device for driving one or more LEDs, depending on LED technology (and also drive current) the LED can be considered to be composed of an ideal voltage source and a series resistance, the latter being called dynamic resistance. To determine the drive voltage amplification factor in dependence on the voltage drop of the dynamic resistance of said load thus means that the control could be somehow adapted to the LED, either by a preset value (hard- or software) or automatically (adaptively) or not at all.

According to another embodiment, said control unit comprises a second feedback loop for controlling said capacitor voltage to swing around a reference capacitor voltage. Preferably, said control unit is configured to determine said reference capacitor voltage in relation to the voltage rating of said low frequency capacitor.

In order to effectively filter most or all mains ripple, the capacitor is preferably capable of storing at least energy Ecapmin>Po/(2 PI fm), wherein Po is the output power and fm the mains frequency. Such a capacitor, however, would lead to 100% ripple (ratio of peak to average voltage is 2). In order to cope with tolerances, aging, and also to relax component stress in the output power stage, the capacitor preferably shows a somewhat higher storage capability Ecapact=N*Ecapmin. This results in a peak to average voltage of about $V_{pk}/V_{avg}=2/(1+\sqrt{(1-1/N)})$. N=2, e.g. means $V_{pk}/V_{avg}=1.2$. Practical ratios preferably lie between 1.05 and 1.3.

Preferably, as mentioned briefly above, said first feedback loop and said second feedback loop are cascaded such that the first feedback loop forms an inner loop to derive an inner control signal and the second feedback loop forms an outer loop to derive an outer control signal. Further, preferably said reference capacitor current is determined from said drive voltage by high-pass filtering said drive voltage, amplifying the high-pass filtered drive voltage by a drive voltage amplification factor, and subtracting said outer control signal from said amplified high-pass filtered drive voltage.

An advantage of cascading is that two control tasks can be dealt with separately: controlling the load current to be constant and controlling the storage capacitor voltage to stay within predefined limits. An advantage of the first feedback loop (inner loop) is that by controlling the capacitor current, which is easily measurable within the output power stage, the load current becomes virtually constant in steady state operation. An advantage of the second feedback loop (outer loop) is that it can easily derive said reference current by taking into account, firstly, a steady state current ripple of an input converter stage (via the high-pass filtered load voltage), secondly, the average capacitor voltage and, in doing so, is also capable of dealing with transients of the input converter stage current (e.g. turn on/off).

In an embodiment, said control unit is configured to add a modulation signal to said reference capacitor current before using it in said first control loop for controlling said capacitor current. Preferably, said control unit is configured to determine said modulation signal from said drive voltage and/or said capacitor voltage. The modulation signal is generally an external signal that is e.g. used to send data via invisible light fluctuations. In order to avoid visible distortions, i.e. to make the light response equal to the modulation signal, a feed forward transfer function for pre-compensation may be applied to the modulation signal, resulting in a modified modulation signal, which is injected into the reference current joint.

There are various implementations for the output power stage, mainly depending on the kind of application of the active capacitor circuit and the kind of load. According to preferred embodiments, said output power stage comprises a bidirectional converter, in particular a bidirectional boost converter, bidirectional buck converter or a bidirectional buck-boost converter. For instance, in an implementation of the bidirectional converter as a bidirectional boost converter, it comprises an output inductor coupled between a switching node of said bidirectional converter and a coupling terminal, and an output capacitor coupled between said coupling terminals.

Advantageously, said control unit is configured to control said bidirectional converter to operate in a quasi square-wave mode. This enables obtaining ZVS (zero voltage switching) and thus enables high switching frequencies (e.g. >1 MHz) still at a high efficiency.

In another embodiment, said control unit is configured to control said bidirectional converter to operate at a higher (preferably much higher) switching frequency than the input converter stage provided in preferred embodiments of the proposed driver device. This may allow completely skipping an output filter of the input converter stage.

The paper "Single Stage Isolated PFC with AC Line Ripple Steering", Bogdan Bucheru, Ionel Dan Jitaru, Delta Energy Systems, USA, PCIM Europe 2011, 17-19 May 2011, Nuremberg, Germany discloses a power architecture providing a solution for low frequency ripple steering. The proposed architecture, however, unlike the present invention, refers to a charger circuit with output voltage control (not current), and to a particular combination of first and second stage, and uses a combined control of both stages. In particular the first stage controls the capacitor voltage of the second stage, which controls the output voltage of the first stage.

According to still another aspect of the present invention, a light apparatus is proposed comprising:
power input terminals for receiving a periodic supply voltage from an external power supply,
an input converter stage coupled to said power input terminals for converting said periodic supply voltage into said drive voltage and for outputting an intermediate current at converter output terminals,
coupling terminals coupled to said converter output terminals of said input converter stage for providing a drive voltage and/or drive current for driving a load to be coupled between said coupling terminals,
an output power stage coupled between said coupling terminals for converting said periodic current into said drive current,
a low frequency capacitor coupled between a capacitor output terminal of said output power stage and a coupling terminal, and
a control unit for controlling said output power stage by use of a control signal obtained from a feedback of the drive voltage, a capacitor voltage across said low frequency capacitor and/or a capacitor current through said low frequency capacitor, and
a light assembly comprising one or more light units, in particular an LED unit comprising one or more LEDs, coupled to said coupling terminals.

Consequently, according to various embodiments of the light apparatus of the present invention, the control unit and/or the output power stage may be part of the active capacitor circuit or the light assembly.

According to still another aspect of the present invention, the input converter stage is not part of the light apparatus, i.e. the light apparatus which is proposed comprises:
power input terminals for receiving a periodic supply voltage from an external power supply,
coupling terminals coupled to said power input terminals for providing a drive voltage and/or drive current for driving a load to be coupled between said coupling terminals,
an output power stage coupled between said coupling terminals for converting said periodic current into said drive current,
a low frequency capacitor coupled between a capacitor output terminal of said output power stage and a coupling terminal, and
a control unit for controlling said output power stage by use of a control signal obtained from a feedback of the drive voltage, a capacitor voltage across said low frequency capacitor and/or a capacitor current through said low frequency capacitor, and
a light assembly comprising one or more light units, in particular an LED unit comprising one or more LEDs, coupled to said coupling terminals.

Consequently, according to various embodiments of the light apparatus of the present invention, the control unit and/or the output power stage may be part of the active capacitor circuit or the light assembly.

BRIEF DESCRIPTION OF THE DRAWINGS

These and other aspects of the invention will be apparent from and elucidated with reference to the embodiment(s) described hereinafter. In the following drawings

DETAILED DESCRIPTION OF THE INVENTION

Figure 1:
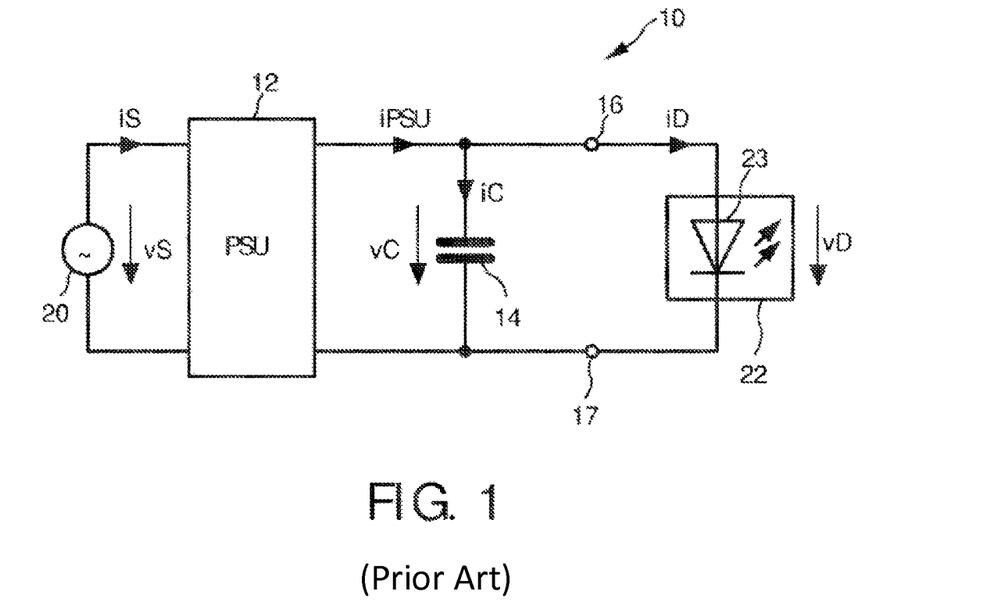
FIG. 1 shows a schematic diagram of a known driver device.

FIG. 1 shows a schematic diagram of a known LED driver device 10 connected to an external power supply 20 (e.g. mains voltage supply). The driver device 10 comprises an input converter stage 12 (also called power supply unit PSU) and an output filter capacitor 14 coupled in parallel to an external load 22, e.g. comprising one or more LEDs 23. The input converter stage 12 converts a supply current iS and a periodic supply voltage vS into an intermediate current iPSU that equals the sum of the drive current (or output current) iD provided to the load and the capacitor current iC. The drive voltage vD across power output terminals 16, 17 equals the capacitor voltage vC.

Here, the average output current iD is preferably controlled by the input converter stage 12, e.g. using load current feedback. For this purpose an (optional) current sensor may be provided in the load which is connected to the input converter stage 12. Accordingly, the average output power is not regulated by the active capacitor circuit.

Figure 2:
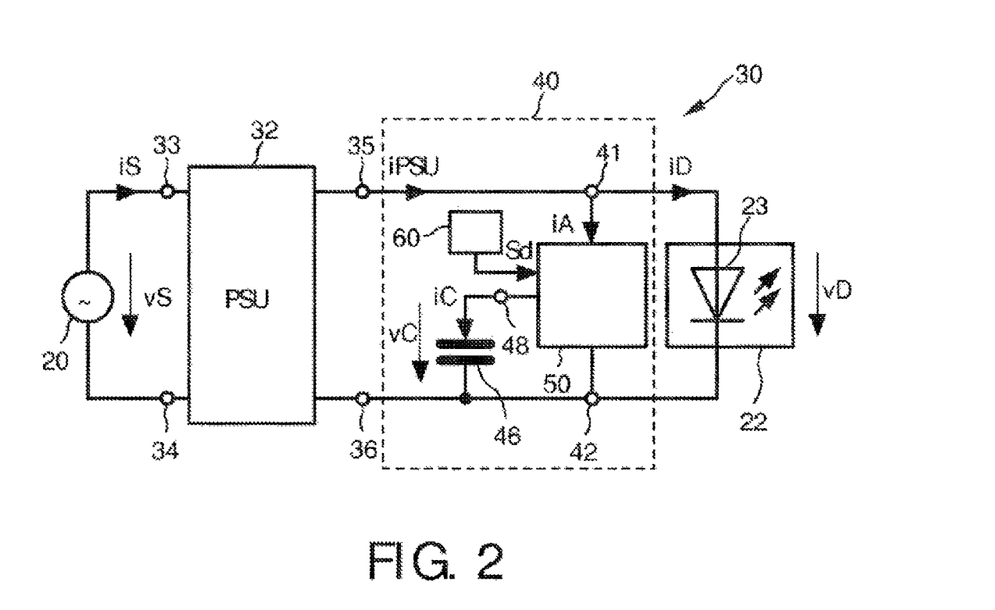
FIG. 2 shows a schematic diagram of a first embodiment of a proposed driver device including an embodiment of a proposed active capacitor circuit.

FIG. 2 shows a schematic diagram of a first embodiment of a proposed driver device 30 including an input converter stage 32 (also called input power stage) and an embodiment of a proposed active capacitor circuit 40 replacing the capacitor 14 of the known driver device 10. The input converter stage 32 is identical or similar to the input converter stage 12 of the known driver device. It shall be noted, however, that the active capacitor circuit 40 may also be used in other driver devices, including driver devices having no input converter stages. At power input terminals 33, 34 the supply unit 20 is coupled to converter input terminals of said input converter stage 32. At converter output terminals 35, 36 of the input converter stage 32 the proposed active capacitor circuit 40 is coupled. Also here, the average output current iD is preferably controlled by the input converter stage 32, e.g. by feeding back the load current, for which purpose an (optional) current sensor may be provided in the load which is connected to the input converter stage 32.

The proposed active capacitor circuit 40 comprises coupling terminals 41, 42 coupled to the converter output terminals 35, 36 of the input converter stage 32 for receiving a periodic input current, in this embodiment the intermediate current iPSU. Further, at said coupling terminals 41, 42, the drive voltage vD and drive current iD are provided for driving the load 23 that is coupled between said coupling terminals 41, 42, which correspond to the power output terminals of the driver device 30.

The proposed active capacitor circuit 40 further comprises an output power stage 50 coupled between said coupling terminals 41, 42 for converting said periodic input current iPSU into said drive current iD. The output power stage 50 particularly receives a power stage current iA. A low frequency capacitor 46 is coupled between a capacitor output terminal 48 of said output power stage 50 and the coupling terminal 42.

Finally, a control unit 60 is provided for controlling said output power stage 50 by use of a control signal Sd obtained from a feedback of the drive voltage vD, a capacitor voltage vC across said low frequency capacitor 46 and/or a capacitor current iC through said low frequency capacitor 46.

Figure 3:
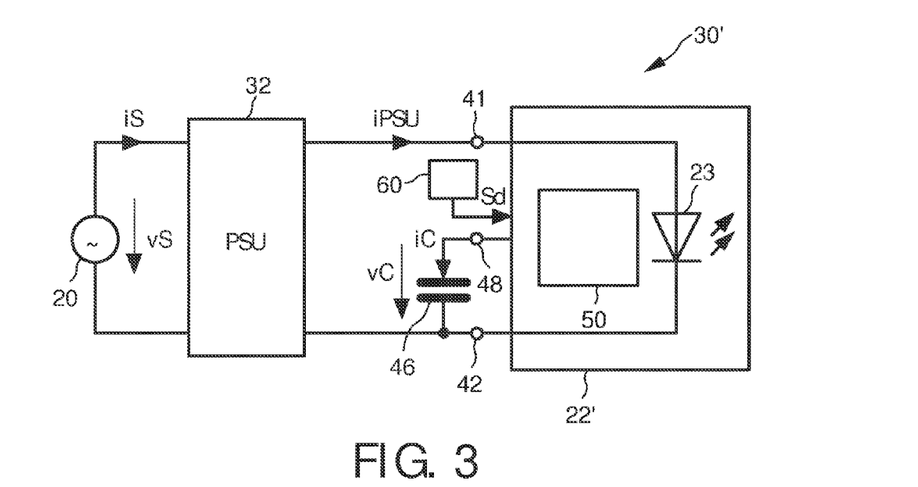
FIG. 3 shows a schematic diagram of a first embodiment of a proposed driver device.

While in the embodiment shown in FIG. 2 the output power stage 50 is included in the active capacitor circuit 40, in an alternative embodiment shown in FIG. 3 the output power stage 50 is integrated into the load 22', i.e. is part of the external elements, not of the driver device 30' shown in FIG. 3. Furthermore (but not shown), in still other embodiments, not only the output power stage 50 but also the control unit 60 is integrated into the load 22' or only the control unit (but not the output power stage 50) is integrated into the load 22'.

Figure 7:
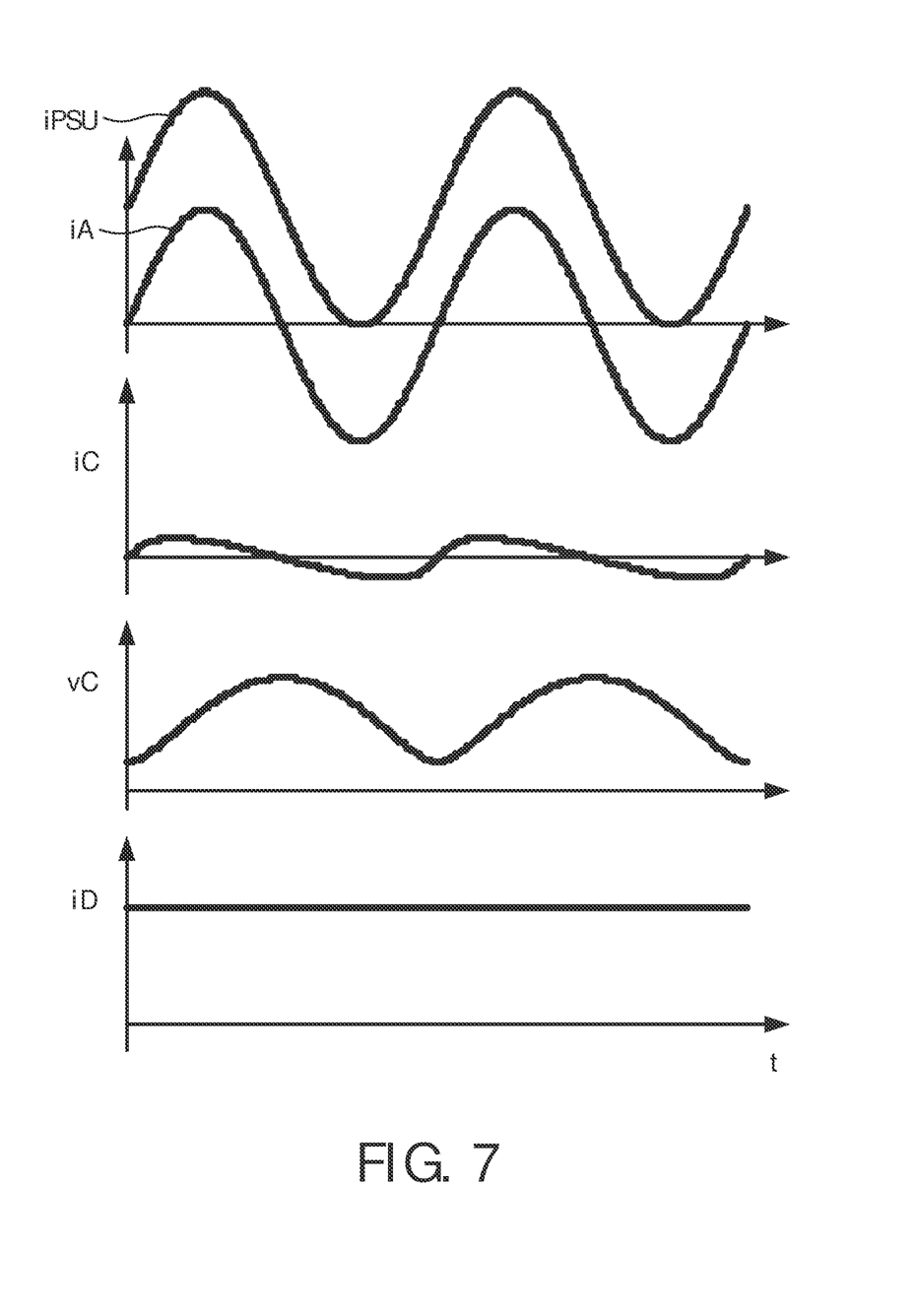
FIG. 7 shows a signal diagram of various signals in a driver device as shown in FIG. 2 or 3, controlled by a control unit as shown in FIG. 5.

For unity power factor operation of the input power stage 32, the intermediate current iPSU exhibits 100% ripple at 100 Hz as shown in FIG. 7.

Figure 4:
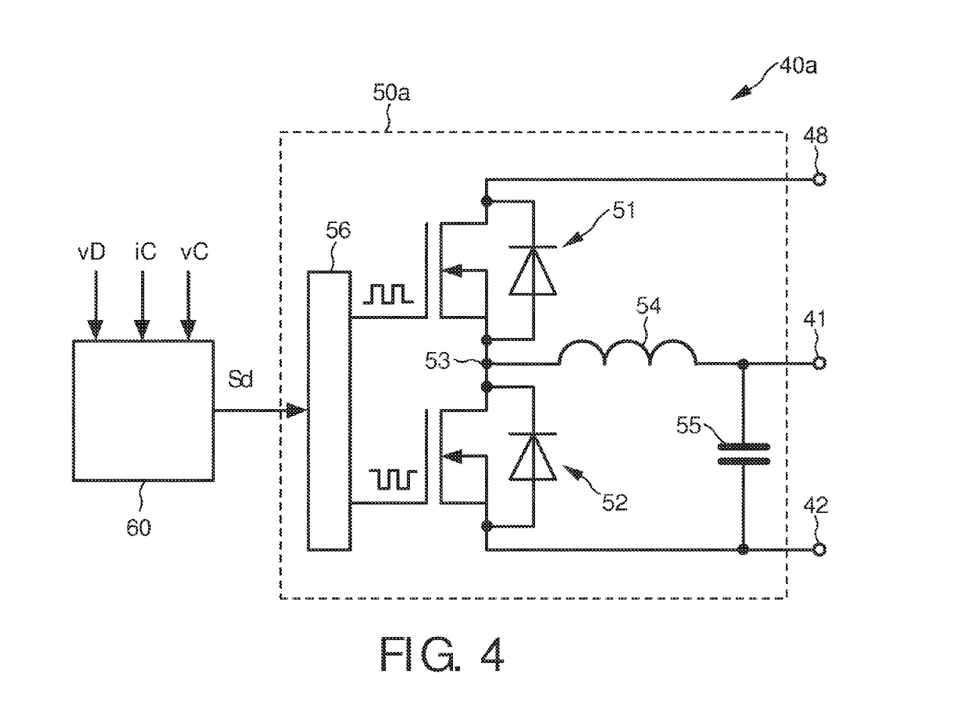
FIG. 4 shows a circuit diagram of an embodiment of a proposed active capacitor circuit.

FIG. 4 shows a circuit diagram of an embodiment of a proposed active capacitor circuit 40a comprising an embodiment of an output power stage 50a which may be used in embodiments of the driver device 30, 30' as shown in FIGS. 2 and 3. The output power stage 50a comprises a bidirectional boost converter, which is preferably used in the case of low voltage LEDs as load. The boost (step up) conversion refers to capacitor charge phases, where the LED voltage is step-up converted to the higher capacitor voltage, whereas during capacitor discharge phases the capacitor voltage is step-down (buck) converted to the LED voltage. In the case of high voltage LEDs, a bidirectional buck converter is preferably used. Other bidirectional converters, such as a buck-boost converter, can also be used in other embodiments.

The bidirectional boost converter comprises two switching elements 51, 52 coupled in series between said capacitor output terminal 48 and the coupling terminal 42 and forming a switch node 53 interposed between them. Further, between said switching node 53 and the coupling terminal 41 a high frequency inductor (choke) 54 is coupled. Between said coupling terminals a high frequency capacitor (input filter capacitor) 55 is coupled. A driver 56 controls said switching elements 51, 52, based on control signals Sd received from the control unit 60. The driver 56 is preferably a gate driver in this embodiment, which is used to drive the gates of the half bridge inverter formed by the switching elements 51, 52 and which follows the switching pattern Sd. Sd generally is a driving signal, which in this example is a PWM switching pattern for the inverter of the output power stage and which determines the average switch node voltage.

Preferably, the converter is operated in a quasi square-wave mode to obtain zero voltage switching (ZVS) and thus enable high switching frequencies (e.g. >1 MHz) still at high efficiency. That switching frequency further allows integration of choke 54 and input filter capacitor 55, which, however, could also be located externally. In addition, a switching frequency much higher than the switching frequency of the input power stage 32 also allows completely skipping the output filter that is preferably included in the input power stage 32.

Figure 5:
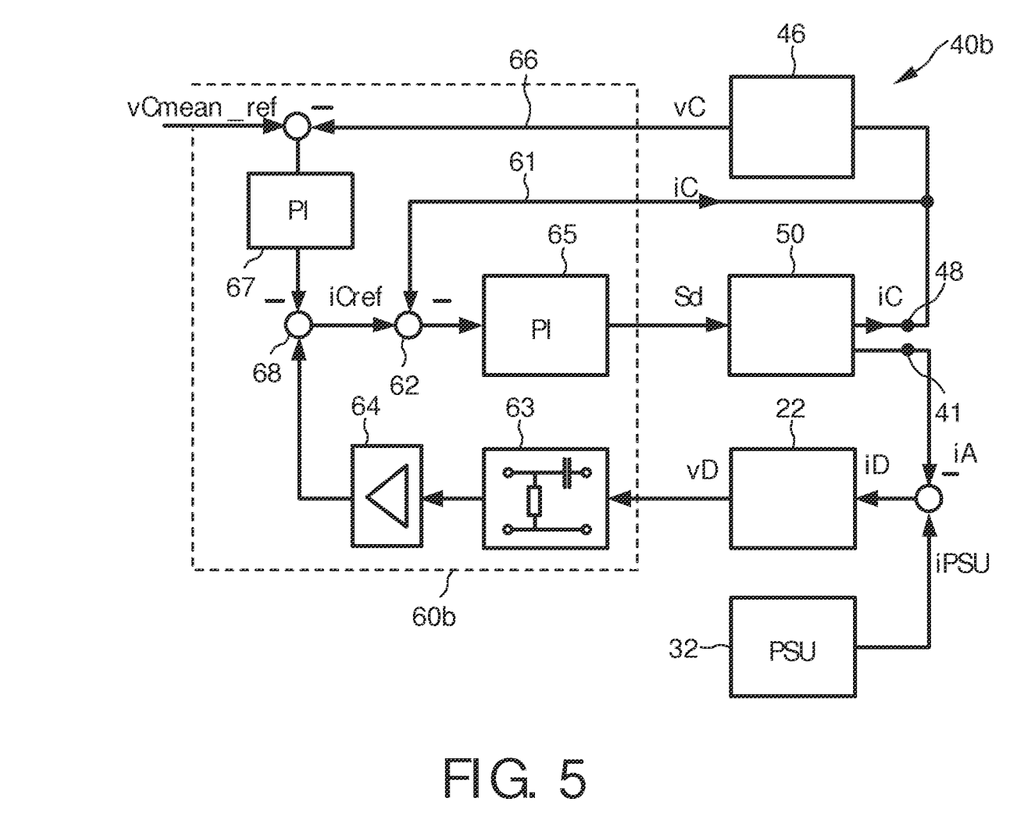
FIG. 5 shows a circuit diagram of another embodiment of a proposed active capacitor circuit showing details of an embodiment of the proposed control unit.

FIG. 5 shows a circuit diagram of another embodiment of an active capacitor circuit 40b showing details of an embodiment of the proposed control unit 60b. Using the control scheme shown in FIG. 5, the ripple current through the load 22 (LED) can be virtually eliminated even if capacitor 46 is only as small as, or a little larger than, the theoretical minimum given by the energy required for zero ripple operation Ecapmin>Po/(2 PI fm), with fm being the mains frequency.

Figure 6:
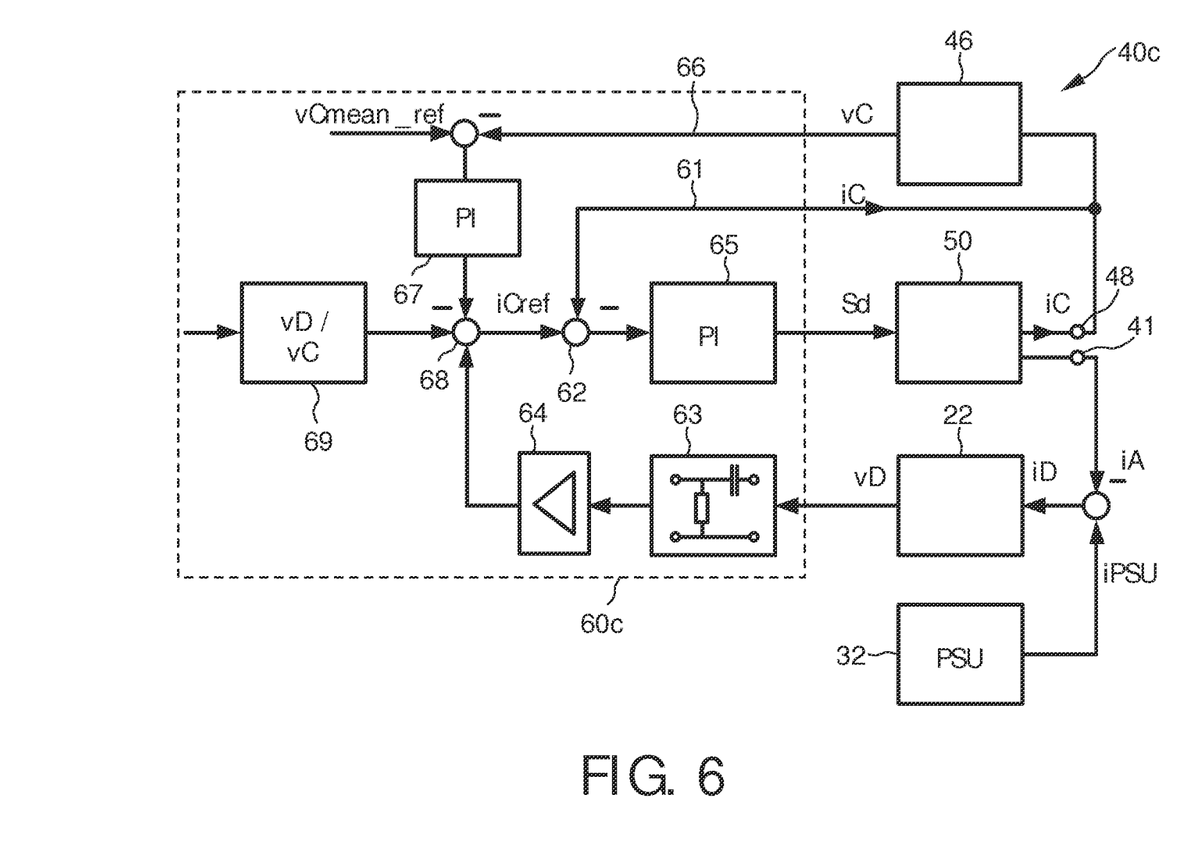
FIG. 6 shows a circuit diagram of another embodiment of a proposed active capacitor circuit showing details of another embodiment of the proposed control unit.

FIG. 6 shows a circuit diagram of still another embodiment of an active capacitor circuit 40c showing details of another embodiment of the proposed control unit 60c. Like in the example of FIG. 5, LED current iD is 1 A and supply current ripple amplitude iA is 1 A too. Capacitor 46 is 22 μF and exhibits a voltage swing from about 5V to 35V. In the example, a 10 mF (6.3V) capacitor in the circuit shown in FIG. 1 would still result in a 20% ripple.

The control units 60b, 60c each comprise two cascaded feedback loops. The core is the inner feedback loop 61 which controls current iC to follow reference current iCref (subtraction unit 62). The reference current iCref in turn is derived from the drive voltage vD by means of high pass filtering in a high pass filter 63 and a proportional factor of amplification in amplifier 64, which is higher according as the voltage drop of the load's dynamic resistance is smaller. The control signal Sd (also called inner control signal) is then generated in a PI controller 65. An outer feedback loop 66 controls capacitor voltage vC to swing around a preset value vCmean_ref, which may be related to the capacitor's voltage rating. Another PI controller 67 generates a correction signal (also called outer control signal). Regarding the control strategy, it is important to note that the average (DC) current delivered to the load still is controlled by the input power stage 32. Further, the active capacitor only eliminates ripple from the load current.

Figure 8:
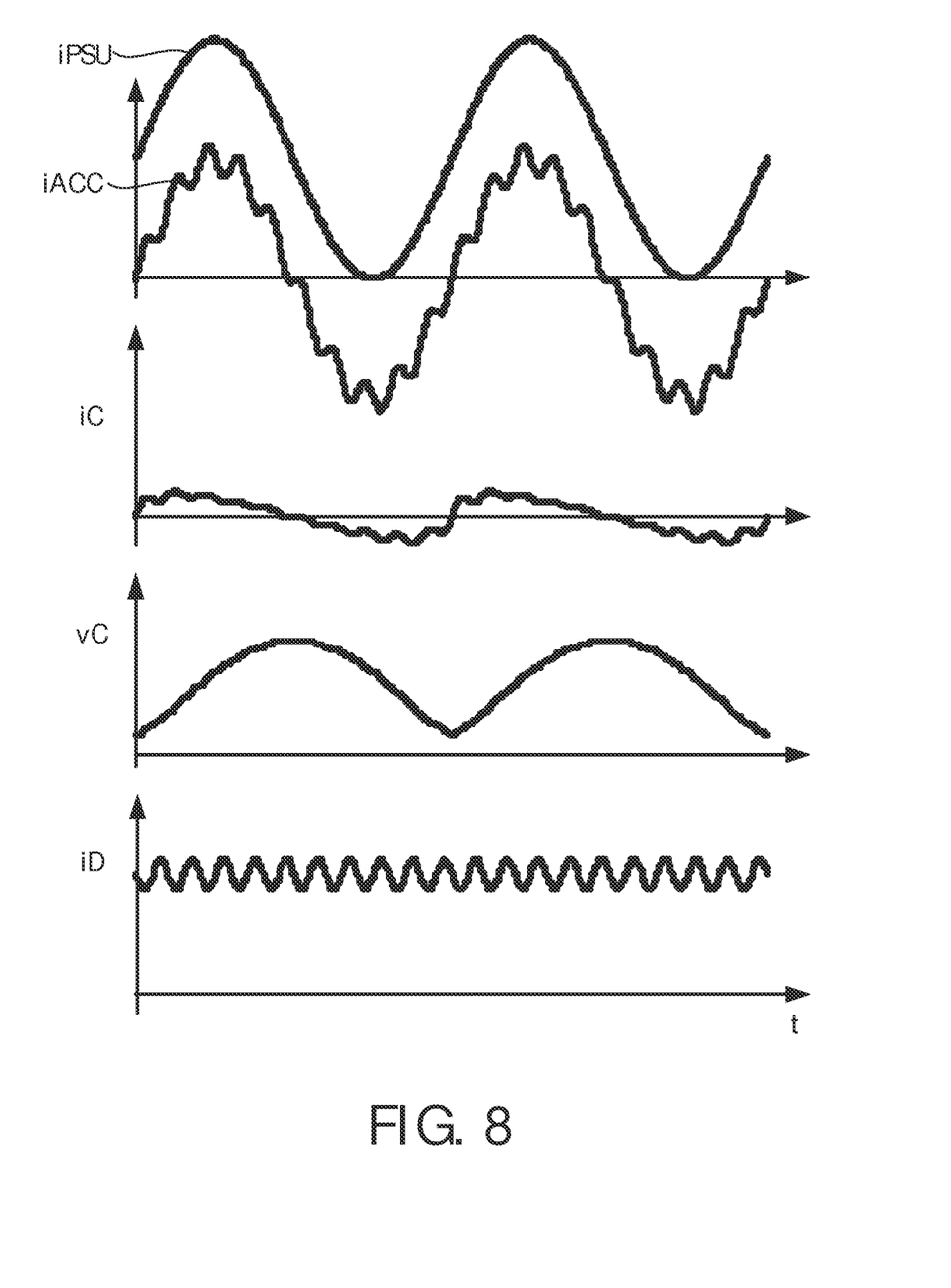
FIG. 8 shows a signal diagram of various signals in a driver device as shown in FIG. 2 or 3, controlled by a control unit as shown in FIG. 6.

In the control unit 60c shown in FIG. 6 an additional modulation unit 69 is provided by which a modulation signal iDmod is added in addition unit 68 to the reference iCref. Said modulation unit 69 preferably comprises a multiplier that depends on voltages vD and vC. This multiplier compensates for the relation of iC to iLED. FIG. 8 shows waveforms resulting from modulation signal iDmod of about 1 kHz.

In this application and in the case of low modulation frequencies (e.g. 1 kHz) an extra inductor (not shown) between the input power stage 32 and the load 22 is preferably provided in an embodiment in order to avoid that the modulation current flows through the input power stage 32. In this case, also a relatively low inductive connection of the load 22 to the active capacitor circuit 40c is of advantage.

The modulation signal iDmod is an external signal (used e.g. to send data via invisible light fluctuations). In order to avoid visible distortions, i.e. to make the light response equal to iDmod, a feed forward transfer function may be applied to iDmod, resulting in iDmod_1, which is injected into the reference current node (i.e. the addition unit 68), namely iDmod_1=iDmod*vD/vC.

As mentioned above, FIG. 7 shows a signal diagram of various signals in a driver device as shown in FIG. 2 or 3, controlled by a control unit as shown in FIG. 5, and FIG. 8 shows a signal diagram of various signals in a driver device as shown in FIG. 2 or 3, controlled by a control unit as shown in FIG. 6. The drive voltage vD, which is not explicitly shown, basically is a constant, because the drive current is constant. Only a tiny variation of the current iD remains, which via the rather small dynamic resistance results in a tiny voltage variation of vD, which in turn shows the shape that the current iC follows.

With respect to typical single-stage high power factor drivers, problems overcome by the present invention include:

high ripple of output current even in the case of large capacitors, which worsens LED utilization and which causes visible flicker;

high volume and lifetime limitations of electrolytic capacitors;

hot swapping issues (in the case that a passive capacitor is connected to the load only, that capacitor is typically very large (as explained above) to be effective at all, which results in high inrush currents) and a low response time to dimming signals.

With respect to the above mentioned converter disclosed in the paper of Hu and Zane, the present invention provides an individual module that can be used either stand-alone or integrated into the load (e.g. an LED package). A connection of the control unit with the input power stage (for combined control) is not required, but only a measurement of the power supply and/or the load current is required.

Regarding the load current (e.g. LED current) modulation ("coded light") no extra components are required and no extra losses exist due to light modulation even at high modulation ratios and high modulation frequencies.

Further, according to preferred embodiments of the present invention, feedback controls derive a reference for the capacitor current from a high-pass filtered load voltage (drive voltage). An extra input allows adding a signal to the reference that translates into current modulation, as it may be used for "coded light".

The present invention is preferably applied in consumer and professional drivers, in particular in professional single-stage HPF flicker-free LED drivers. The active capacitor circuit may be used as an added value system in an LED package (with or without a miniaturized filter capacitor). Further, the active capacitor circuit may be used as stand-alone module (with or without miniaturized filter capacitor). Still further, the present invention may also be used for driving OLEDs.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. An active capacitor circuit for use in a driver device for driving a load, the load comprising an LED unit comprising one or more LEDs, said active capacitor circuit comprising:

coupling terminals for providing a drive voltage and a drive current for driving the load to be coupled between said coupling terminals, an output power stage coupled between said coupling terminals for converting a periodic current into said drive current, a low frequency capacitor coupled between a capacitor output terminal of said output power stage and the coupling terminal, and a control unit for controlling said output power stage by use of a control signal obtained from a feedback of the drive voltage and/or a capacitor voltage across said low frequency capacitor, and a capacitor current through said low frequency capacitor, wherein said control unit comprises a first feedback loop for controlling said capacitor current to follow a reference capacitor current.

2. The active capacitor circuit as claimed in claim 1, wherein said control unit is configured to determine said reference capacitor current from said drive voltage by high-pass filtering said drive voltage and amplifying the high-pass filtered drive voltage by a drive voltage amplification factor.

3. The active capacitor circuit as claimed in claim 2, wherein said control unit is configured to determine said drive voltage amplification factor in dependence on the voltage drop of the dynamic resistance of said load to be coupled between said coupling terminals.

4. The active capacitor circuit as claimed in claim 1, wherein said control unit comprises a second feedback loop for controlling said capacitor voltage to swing around a reference capacitor voltage.

5. The active capacitor circuit as claimed in claim 4, wherein said control unit is configured to determine said reference capacitor voltage in relation to the voltage rating of said low frequency capacitor.

6. The active capacitor circuit as claimed in claim 4, wherein said first feedback loop and said second feedback loop are cascaded such that the first feedback loop forms an inner loop to derive an inner control signal and the second feedback loop forms an outer loop to derive an outer control signal, wherein said reference capacitor current is determined from said drive voltage by high-pass filtering said drive voltage, amplifying the high-pass filtered drive voltage by a drive voltage amplification factor, and subtracting said outer control signal from said amplified high-pass filtered drive voltage.

7. The active capacitor circuit as claimed in claim 1, wherein said control unit is configured to add a modulation signal to said reference capacitor current before using it in said first control loop for controlling said capacitor current.

8. The active capacitor circuit as claimed in claim 7, wherein said control unit is configured to determine said modulation signal from said drive voltage and/or said capacitor voltage.

9. The active capacitor circuit as claimed in claim 1, wherein said output power stage comprises a bidirectional converter, in particular a bidirectional boost converter, a bidirectional buck converter or a bidirectional buck-boost converter.

10. The active capacitor circuit as claimed in claim 9, wherein said control unit is configured to control said bidirectional converter to operate in a quasi square-wave mode.

11. The active capacitor circuit as claimed in claim 9, wherein said bidirectional converter comprises an output inductor coupled between a switching node of said bidirectional converter and a coupling terminal and an output capacitor coupled between said coupling terminals.

12. A driver device for driving a load, comprising an LED unit comprising one or more LEDs, said driver device comprising:

power input terminals for receiving a periodic supply voltage from an external power supply, an input converter stage coupled to said power input terminals for converting said periodic supply voltage into said drive voltage and for outputting an intermediate current at converter output terminals, and an active capacitor circuit as claimed in claim 1 coupled to said converter output terminals of said input converter stage.

13. The driver device as claimed in claim 12, wherein said control unit is configured to control said bidirectional converter to operate at a higher switching frequency than the input converter stage.

14. A light apparatus comprising:
power input terminals for receiving a periodic supply voltage from an external power supply,
an input converter stage coupled to said power input terminals for converting said periodic supply voltage into said drive voltage and for outputting an intermediate current at converter output terminals,
an active capacitor circuit according to claim 1 coupled to said converter output terminals of said input converter stage and
a light assembly comprising one or more light units, in particular an LED unit comprising one or more LEDs, coupled to said coupling terminals.

* * * * *